US 7,143,250 B1

(12) United States Patent
Riedl

(10) Patent No.: US 7,143,250 B1
(45) Date of Patent: Nov. 28, 2006

(54) METHODS AND SYSTEMS FOR IMPROVING MIRROR PERFORMANCE VIA OPTIMIZED MULTI-CHANNEL UTILIZATION

(75) Inventor: Daniel A. Riedl, Andover, KS (US)

(73) Assignee: LSI Logic Corporation, Milpitas, CA (US)

( * ) Notice: Subject to any disclaimer, the term of this patent is extended or adjusted under 35 U.S.C. 154(b) by 443 days.

(21) Appl. No.: 10/453,133

(22) Filed: Jun. 2, 2003

(51) Int. Cl.
  G06F 12/16 (2006.01)
  G06F 3/00 (2006.01)
  G06F 9/46 (2006.01)
(52) U.S. Cl. .......................... 711/162; 710/37; 710/38; 718/105
(58) Field of Classification Search ................. 710/37, 710/38
  See application file for complete search history.

(56) References Cited

U.S. PATENT DOCUMENTS

| 5,390,313 | A | | 2/1995 | Yanai et al. ................. 395/425 |
| 6,145,028 | A | * | 11/2000 | Shank et al. .................. 710/31 |
| 6,324,654 | B1 | | 11/2001 | Wahl et al. ..................... 714/6 |
| 6,467,034 | B1 | | 10/2002 | Yanaka ........................ 711/162 |
| 6,493,796 | B1 | | 12/2002 | Arnon et al. ............... 711/114 |
| 6,499,091 | B1 | | 12/2002 | Bergsten ..................... 711/162 |
| 6,732,243 | B1 | * | 5/2004 | Busser et al. ............... 711/162 |
| 6,738,839 | B1 | * | 5/2004 | Sinha .......................... 710/39 |
| 2002/0087790 | A1 | * | 7/2002 | Barth et al. ................. 711/114 |
| 2002/0103966 | A1 | | 8/2002 | Wu et al. .................... 711/114 |
| 2002/0138696 | A1 | | 9/2002 | Kodama et al. ............ 711/114 |
| 2003/0088735 | A1 | | 5/2003 | Busser et al. ............... 711/114 |

\* cited by examiner

Primary Examiner—Matthew Kim
Assistant Examiner—Shane M. Thomas
(74) Attorney, Agent, or Firm—Ortiz & Lopez, PLLC

(57) ABSTRACT

Methods and systems for optimizing data mirroring operations are disclosed. One or more data channels can be selected from among a plurality of data channels associated with a data-processing system, such that the selected data channel or data channels can comprise a data channel that is the least occupied data channel among the plurality of data channels. A plurality of data mirroring operations can then operate simultaneously on the selected data channel or data channels, in response to selecting the data channel form among the plurality of data channels, thereby optimizing data mirroring operations associated with said data-processing system.

13 Claims, 6 Drawing Sheets

METHODS AND SYSTEMS FOR IMPROVING MIRROR PERFORMANCE VIA OPTIMIZED MULTI-CHANNEL UTILIZATION

TECHNICAL FIELD

The present invention is generally related to data-processing methods and systems. The present invention is also related to data transfer and storage methods and systems. The present invention is specifically related to data mirroring operations.

BACKGROUND OF THE INVENTION

The goal of mirroring is to copy data from one location to another, thereby resulting in two copies of the same data, with the premise that if one copy is destroyed, the other copy is still available, and hence, there is no loss of valuable data. In order to provide the fastest and most reliable way to save the data, dual disk array controllers should be utilized. These disk array controllers employ a data cache, where the user's data is initially written prior to finally being written to a physical medium such as a disk drive.

For a fault tolerant system, the dual controllers maintain a copy of each other's data caches, such that if one controller fails to write the cached data to the physical medium, the other controller will use its copy of the data to write it to the physical medium. One of the primary problems associated with mirroring is that it takes some additional time to perform the copy operation. The additional time spent making this copy reduces the amount of time, which can be spent on other data storage and retrieval operations. Performance suffers when mirroring is being performed, possibly by as much as 30 to 40 percent. Clearly, this performance degradation is undesirable.

The present inventor has therefore concluded that a need exists for improved methods and systems for enhancing the performance of data mirroring operations. The present inventor believes that this can be achieved through a fundamental rearrangement of traditional mirroring approaches, including new techniques for prioritizing and queuing, which are disclosed in further detail herein.

BRIEF SUMMARY OF THE INVENTION

The following summary of the invention is provided to facilitate an understanding of some of the innovative features unique to the present invention and is not intended to be a full description. A full appreciation of the various aspects of the invention can be gained by taking the entire specification, claims, drawings and abstract as a whole.

It is therefore one aspect of the present invention to provide improved data-processing methods and systems.

It is an additional aspect of the present invention to provide improved data transfer and storage methods and systems.

It is yet a further aspect of the present invention to provide improved data mirroring operations.

The above and other aspects of the invention can be achieved as will now be briefly described. Methods and systems for optimizing data mirroring operations are disclosed herein. One or more data channels can be selected from among a plurality of data channels associated with a data-processing system, such that the selected data channel or data channels can comprise a data channel that is the least occupied data channel among the plurality of data channels. A plurality of data mirroring operations can then operate simultaneously on the selected data channel or data channels, in response to selecting the data channel form among the plurality of data channels.

Additionally, controller hardware associated with the data channel can be examined utilizing a driver device of the data-processing system. Data can be transferred from the driver, such that the transferred data includes a maximum data length that is determined by a maximum data size supported by the controller hardware. Also a request for a data mirroring operation associated with the transfer of the data from the driver can be automatically divided into a plurality of maximum-sized data mirroring operations, if the data comprises a data length that exceeds the maximum data size supported by the controller, thereby optimizing data mirroring operations associated with the data-processing system.

The invention described herein generally improves mirror performance by queuing multiple data mirroring operations on every channel simultaneously, creating the ideal sized read or write operation so as to achieve full channel utilization, providing all data transfer information requirements at the same time a mirroring command is sent, ensuring that the least busy channel is always utilized when mirroring operations are being initiated, and designating priorities for each channel.

BRIEF DESCRIPTION OF THE DRAWINGS

The accompanying figures, in which like reference numerals refer to identical or functionally-similar elements throughout the separate views and which are incorporated in and form part of the specification, further illustrate the present invention and, together with the detailed description of the invention, serve to explain the principles of the present invention.

DETAILED DESCRIPTION OF THE INVENTION

The particular values and configurations discussed in these non-limiting examples can be varied and are cited merely to illustrate an embodiment of the present invention and are not intended to limit the scope of the invention.

Figure 1:
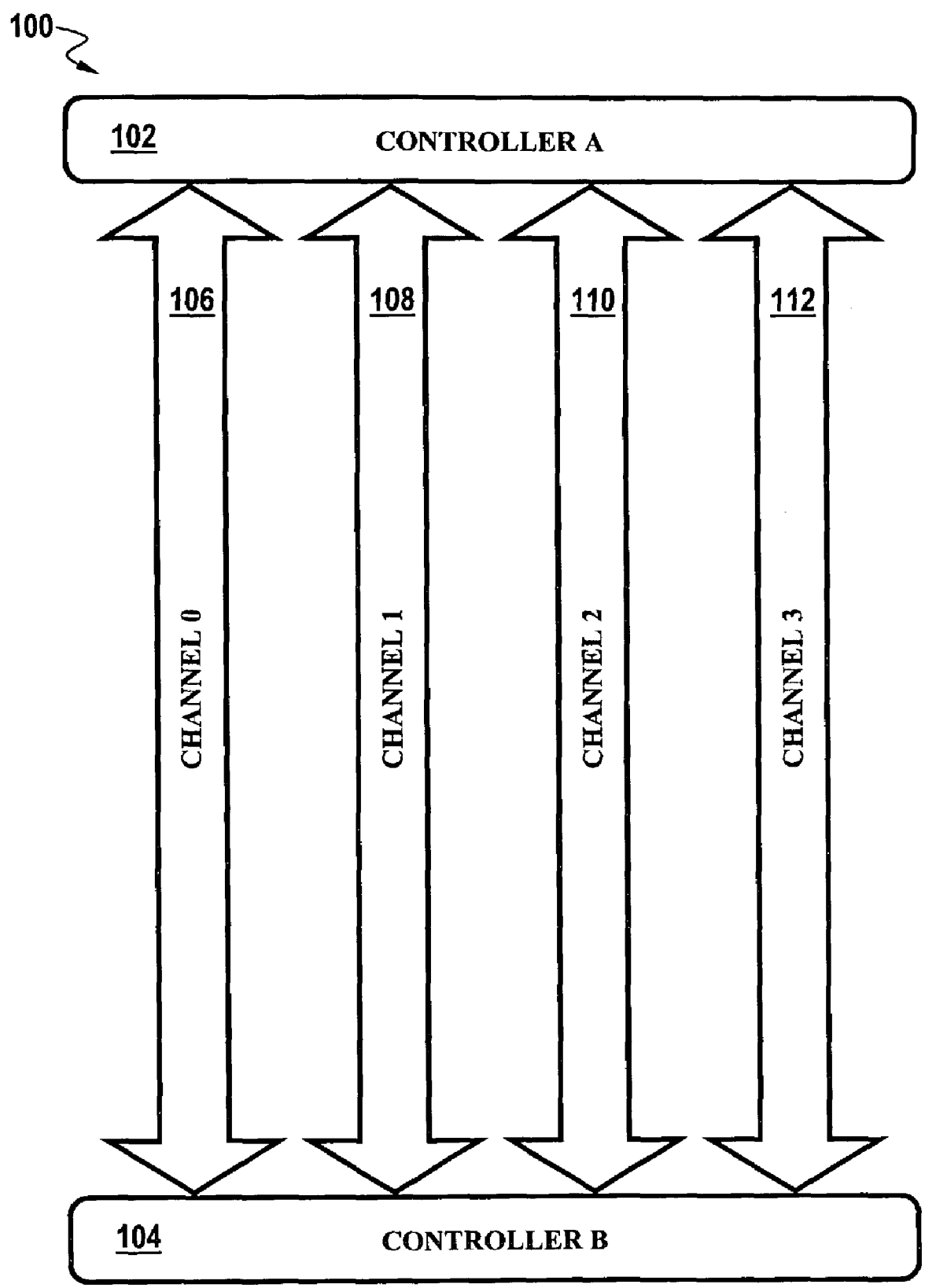
FIG. 1 illustrates a block diagram of a conventional mirroring system, including two mirroring controllers and four IO channels therebetween.

FIG. 1 illustrates a block diagram of a conventional mirroring system 100, including two mirroring controllers and four IO channels. In FIG. 1, a controller 102 and a controller 104 can be disposed with four channels 106, 108, 110, and 112 therebetween. Mirroring involves the copying of data from one location to another, which can result in two copies of the same data. If one copy is destroyed, the other copy will still be available, ensuring that valuable data is not lost. Dual disk array controllers 102 and 104 can be utilized in a data mirroring operation. Each controller 102 and 104 can employ a data cache (not shown in FIG. 1), where the user's data is first written before it is finally transferred to a physical medium, such a disk drive.

Figure 2:
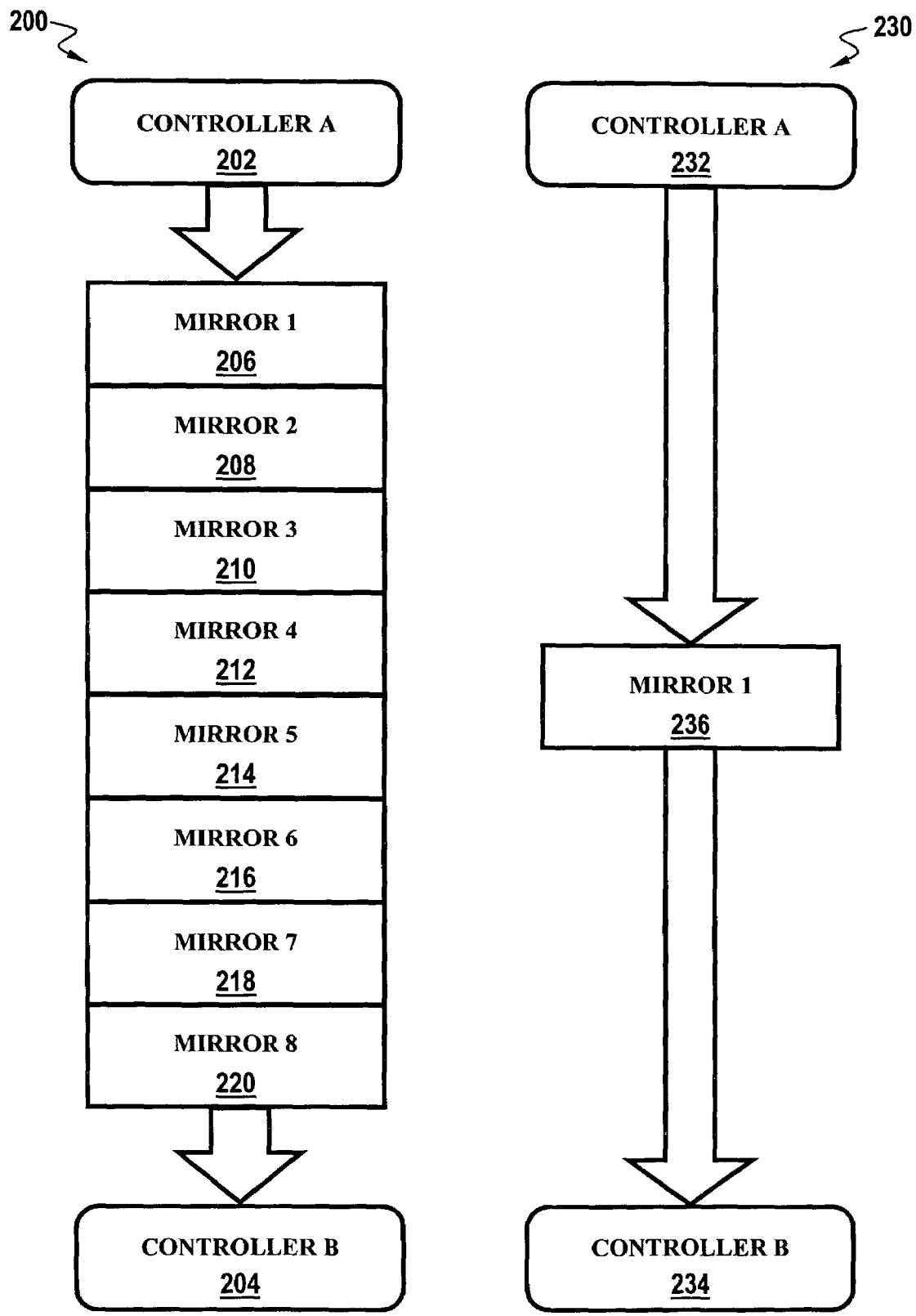
FIG. 2 illustrates a block diagram illustrating queuing of mirroring commands in accordance with a preferred embodiment of the present invention, versus conventional queuing.

FIG. 2 illustrates a block diagram illustrating queuing of mirroring commands in accordance with a preferred embodiment of the present invention, versus conventional queuing. Mirroring system includes two controllers 204 and 202 and a plurality of mirrors 206 to 220. System 230 includes controllers 232 and 234, and a single mirror 236. System 230 represents a non-optimized mirroring solution in which only one mirror operation is active on any one channel at a time. System 200, on the other hand, provides for multiple mirror operations to be active on a single channel at the same time. System 200 thus permits both array controllers 202 and 204 to maximize their processing power by working on many tasks simultaneously, thereby capitalizing on multi-tasking capabilities of their associated processor, which can provide for a faster response.

Figure 3:
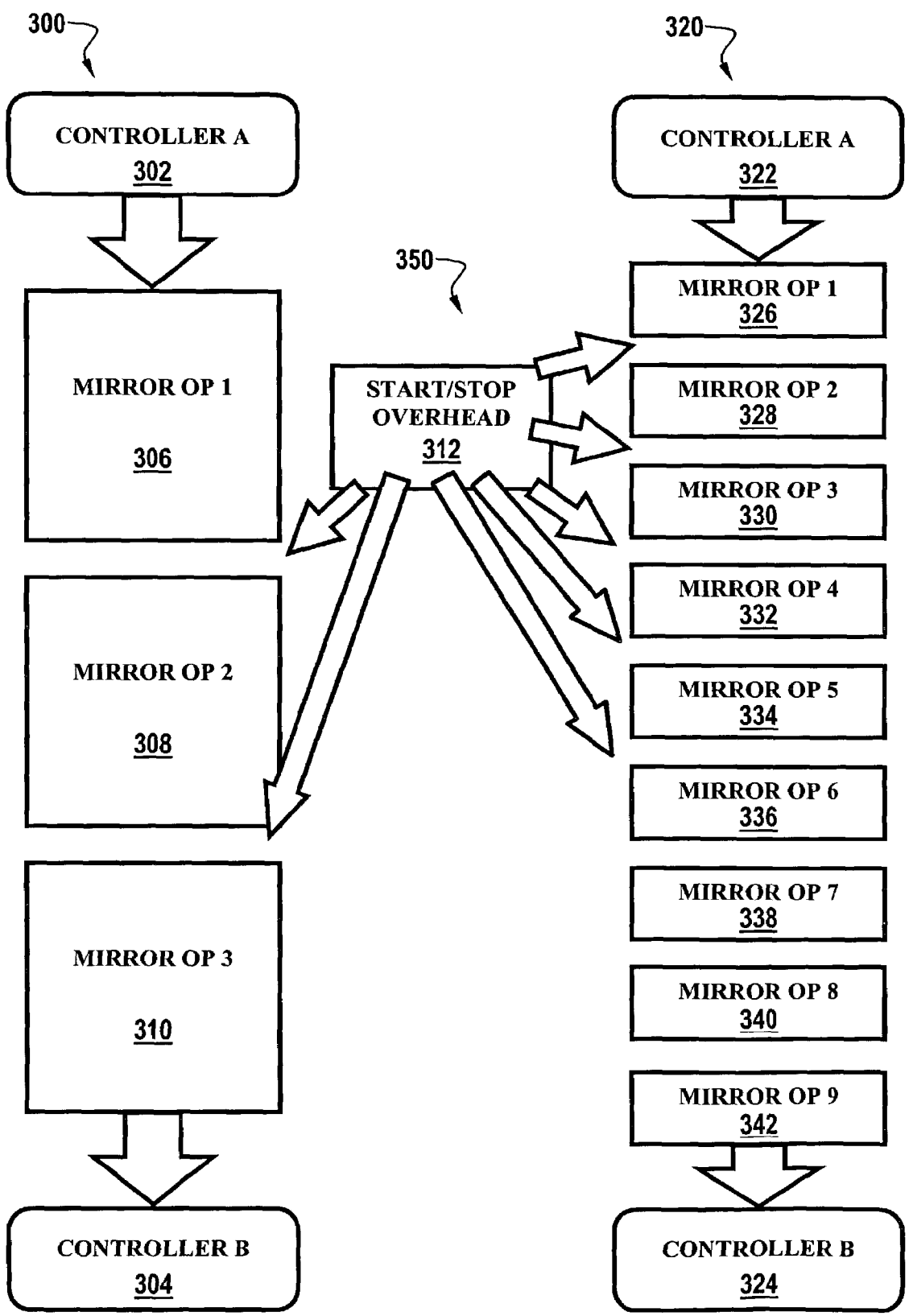
FIG. 3 illustrates a block diagram illustrating a mirroring system, which can be implemented in accordance with an alternative embodiment of the present invention, versus a conventional mirroring system.

FIG. 3 illustrates a block diagram illustrating a mirroring system, 300 which can be implemented in accordance with an alternative embodiment of the present invention, versus a conventional mirroring system 320. System 300 includes controllers 302 and 304, and a plurality of mirror operations 306, 308, and 310 therebetween. System 320 also includes a controller 322 and a controller 324 and a plurality of mirror operations 326 to 342 therebetween.

In FIG. 3, start/stop overhead operations for both systems 300 and 324 are indicated by block 312. Block 312 indicates that a fixed amount of overhead is usually required to start or stop each data phase. With every command there is a certain degree of overhead on the data channel, for example, when it comes to starting and stopping a data phase. Normally, the overhead is the same for a small IO as it is for a much larger IO. In terms of data throughput, larger IO's are far superior in achieving larger IO transfers.

A non-optimized solution, such as system 320, generally sends the mirroring requests as they are received by the driver, resulting in some very large mirroring operations and many smaller, time consuming mirroring operations. System 300, on the other hand, calls for the driver to examine the capabilities of the controller hardware, and if possible, always send IO's with the maximum data lengths possible, through concatenation of smaller non-optimal mirror requests into larger maximum sized mirror operations, and through a dividing or breaking-up of mirror requests which are larger than the maximum-sized supported by the hardware into multiple maximum sized mirror operations.

Figure 4:
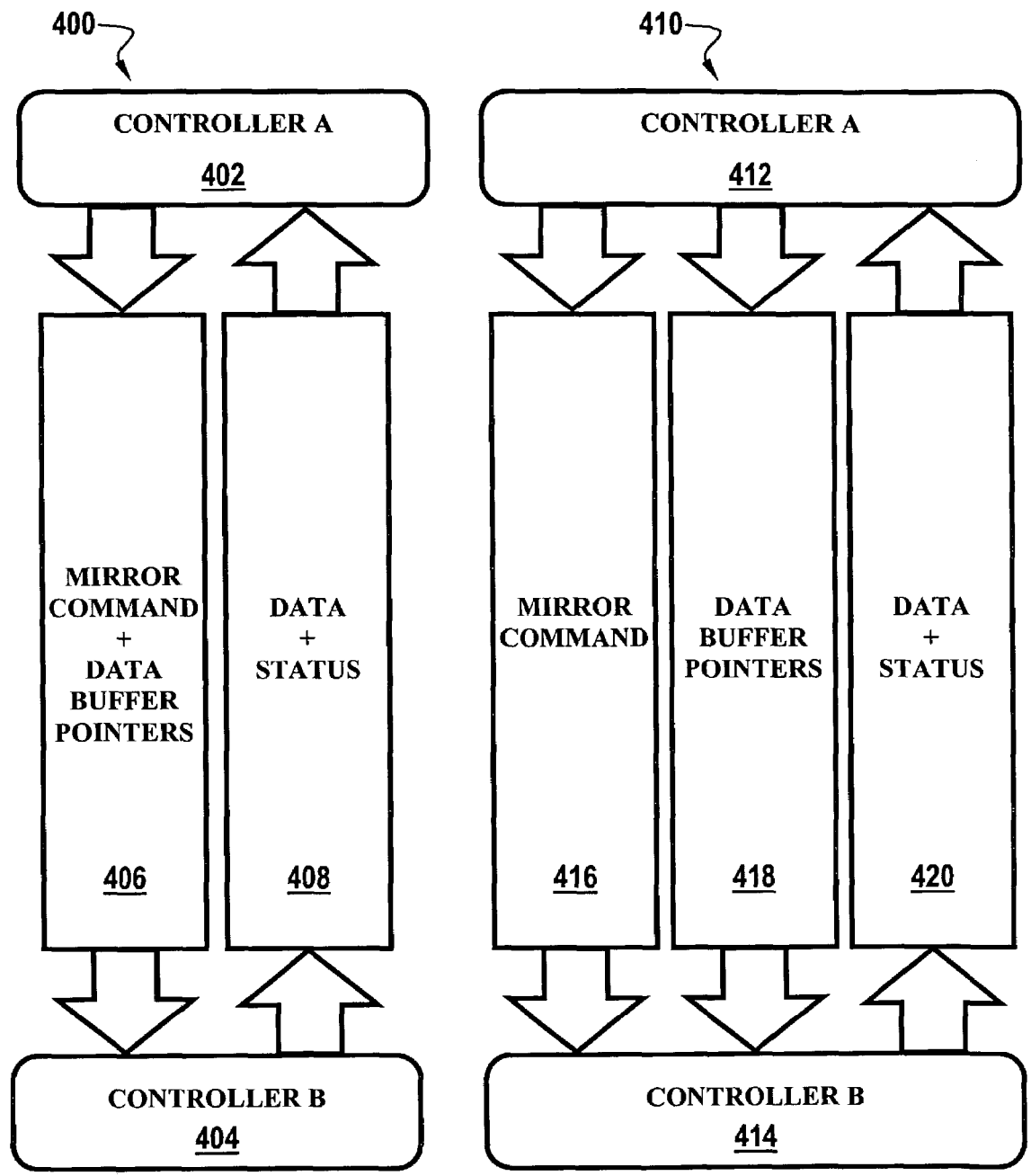
FIG. 4 illustrates a block diagram illustrating a mirroring system, which can be implemented in accordance with an alternative embodiment of the present invention, versus a conventional mirroring system.

FIG. 4 illustrates a block diagram illustrating a mirroring system 400, which can be implemented in accordance with an alternative embodiment of the present invention, versus a conventional mirroring system 410. System 400 includes a controller 402 and a controller 404. A combined mirror command and data buffer pointers descriptor 406 is located between controllers 402 and 404. A combined data and status descriptor 408 is also located between controllers 402 and 404. System 410, on the other hand, includes a controller 412 and a controller 414. A mirror command descriptor 416, a data buffer points descriptor 418 and a combined data and status descriptor 420 are located between controllers 412 and 414.

System 410 represents a non-optimized solution, in which mirroring commands specify that a mirror read or mirror write operation be performed. When the receiving controller requests the data location and length information, the initiating controller supplies this last piece of information. The result of system 410 is that it requires an additional data exchange phase, for the transfer of data descriptors. System 400, on the other hand, calls for the initiating controller to supply the data descriptor information along with the command descriptor, thereby eliminating one entire data phase, which enhances performance of the entire mirroring operation. As previously discussed, there is always a fixed amount of overhead required to start or stop each data phase.

Figure 5:
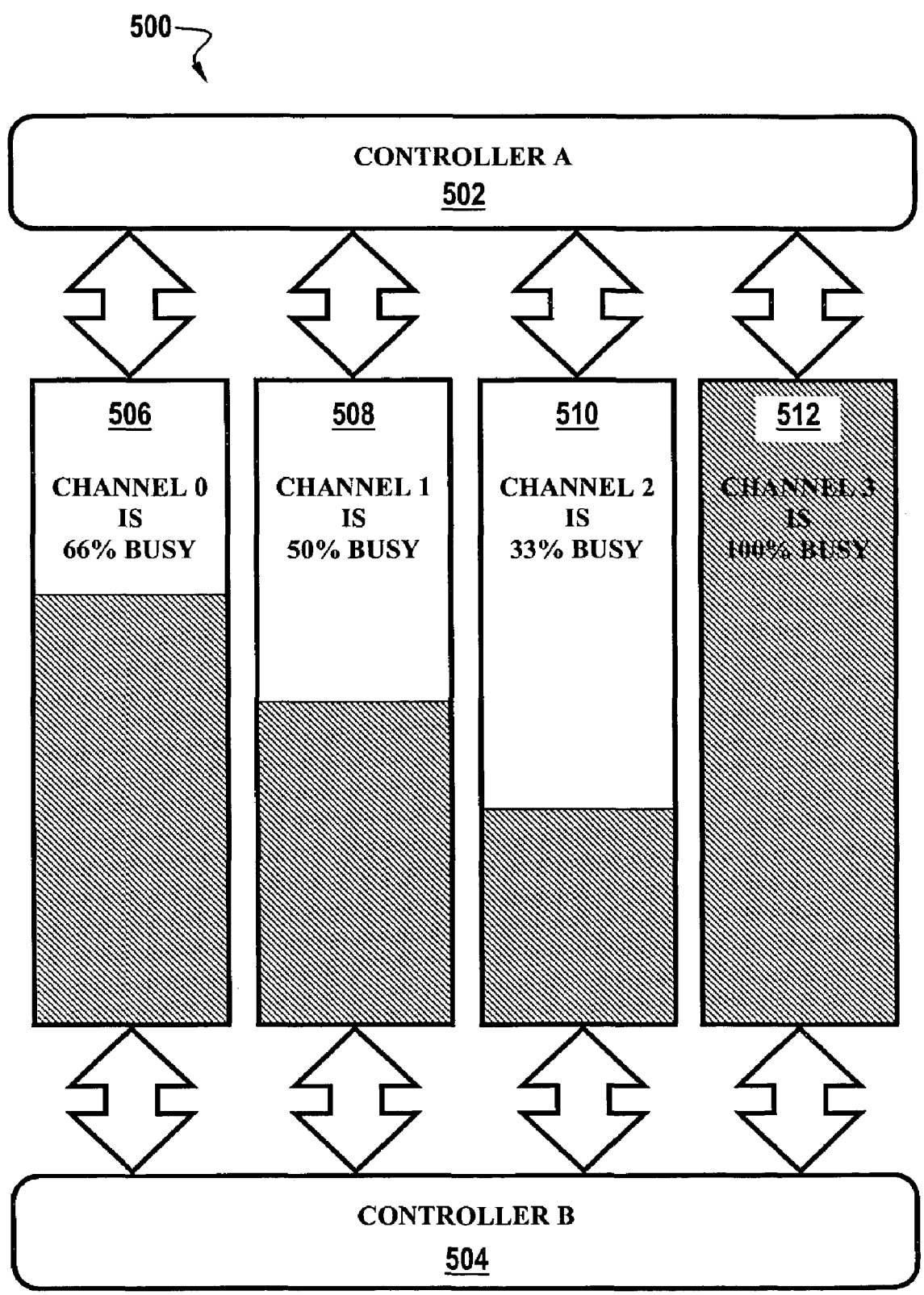
FIG. 5 illustrates a block diagram illustrating a mirroring system in which the least busy channel is utilized, in accordance with an alternative embodiment of the present invention.

FIG. 5 illustrates a block diagram illustrating a mirroring system 500 in which the least busy channel is utilized, in accordance with an alternative embodiment of the present invention. System 500 includes a controller 502 and a controller 504. A plurality of channels 506, 508, 510 and 512 are located between controllers 502 and 504. When utilizing multiple channels to transfer mirroring operations between controllers, a non-optimized solution might simply select the first available channel to be utilized for the mirroring operation, without regard to the current workload of the individual channels. The channel selected for use might be the busiest channel, which probably means that this mirroring operation will suffer some unnecessary delay.

System 500, on the other hand, examines all available channels, and selects the least busy channel for utilization by the data mirroring operation, thereby reducing the wait time for the mirror operation to complete. For example, in FIG. 5, the least busy channel would be channel 510, which is only 33% busy. A non-optimized solution, however, would likely choose the first channel, which has any available capacity, such as channel 506, which is 66% busy.

Figure 6:
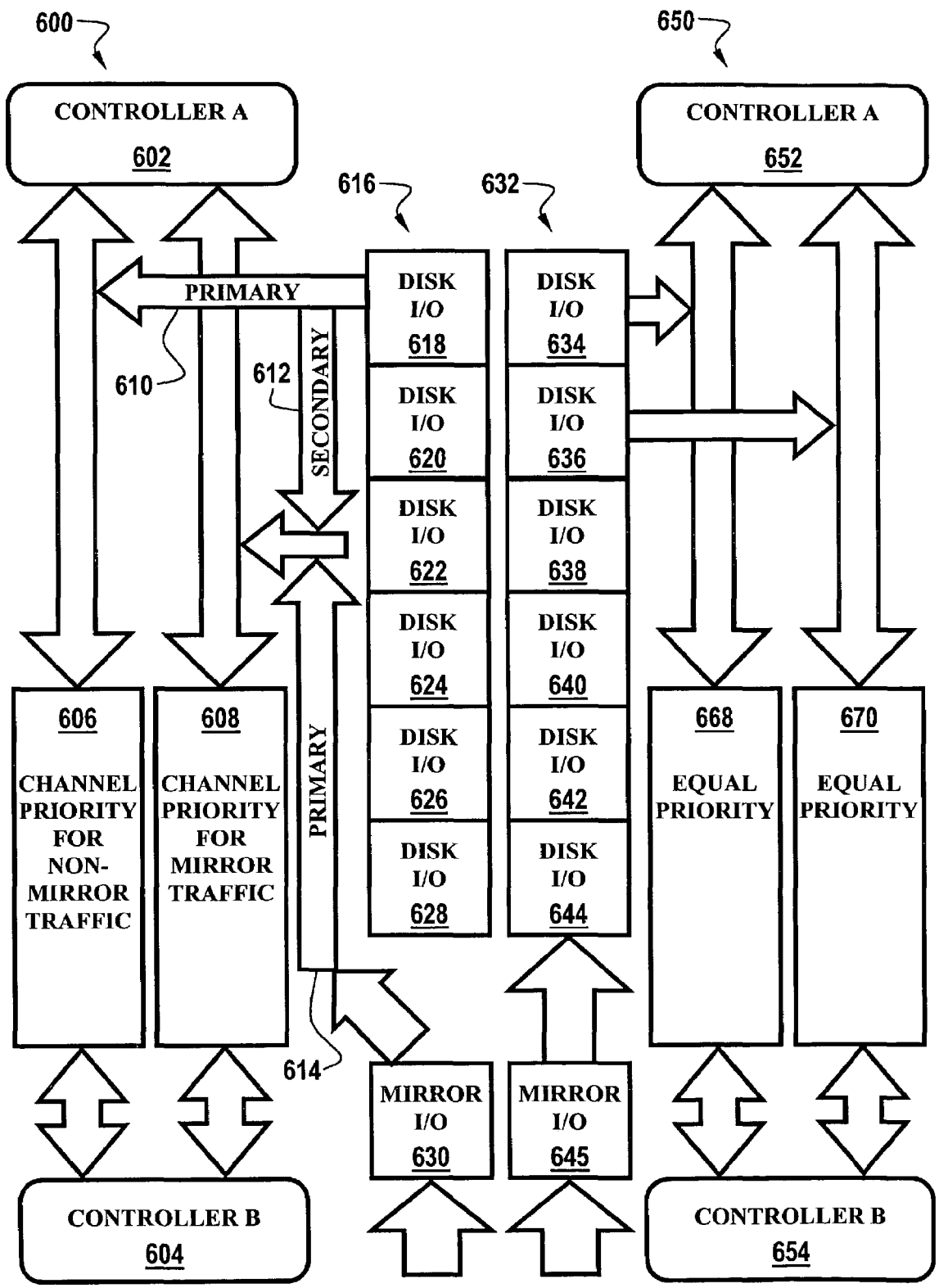
FIG. 6 illustrates a block diagram illustrating a mirroring system in which channels are prioritized, in accordance with an alternative embodiment of the present invention, versus a conventional mirroring system.

FIG. 6 illustrates a block diagram illustrating a mirroring system 600 in which channels are prioritized, in accordance with an alternative embodiment of the present invention, versus a conventional mirroring system 650. System 600 includes a controller 602 and a controller 604, along with channels 606 and 608. Channel 606 is prioritized for non-mirror traffic, while channel 608 is prioritized for mirror traffic. System 600 also includes disk IO's 616 to 628. Arrows 610, 612 and 614 indicate prioritization according to primary and secondary importance. Thus, in system 600 channels are given priorities. For example, mirror IO 630 of system 600 can be sent immediately on a mirror priority channel.

In system 650, on the other hand, all channels have the same priority. System 650 includes a controller 652 and a controller 654. Channels 668 and 670 are given equal priority. System 650 also includes disk IO's 634 to 644 and a mirror IO 645. System 650 represents a non-optimized solution in which all available channels give equal priority to all operations, such that if there are 10 disk operations queued ahead of 10 mirror operations, all 10 disk operations would be sent before any of the mirror operations.

In system 600, on the other hand, one or more channels can be designated as giving priority to mirror operations, while the other channels can be designated as giving priority to disk operations. For example, if 10 disk operations are queued on a channel designated as giving priority to mirror operations, then at yeast a percentage of those 10 mirror operations would be sent before the disk operations. The percentage could be designated a tuning parameter by the system administrator. Time-critical mirror operations would always be sent utilizing the channels where mirroring operations are given priority.

Based on the foregoing, it can be appreciated that methods and systems for optimizing data mirroring operations are disclosed herein. One or more data channels can be selected from among a plurality of data channels associated with a data-processing system, such that the selected data channel or data channels can comprise a data channel that is the least occupied data channel among the plurality of data channels. A plurality of data mirroring operations can then operate simultaneously on the selected data channel or data channels, in response to selecting the data channel form among the plurality of data channels.

Additionally, controller hardware associated with the data channel can be examined utilizing a driver device of the data-processing system. Data can be transferred from the driver, such that the transferred data includes a maximum data length that is determined by a maximum data size supported by the controller hardware. Also a request for a data mirroring operation associated with the transfer of the data from the driver can be automatically divided into a plurality of maximum-sized data mirroring operations, if the data comprises a data length that exceeds the maximum data size supported by the controller, thereby optimizing data mirroring operations associated with the data-processing system.

The invention described herein generally improves mirror performance by queuing multiple data mirroring operations on every channel simultaneously, creating the ideal sized read or write operation so as to achieve full channel utilization, providing all data transfer information requirements at the same time a mirroring command is sent, ensuring that the least busy channel is always utilized when mirroring operations are being initiated, and designating priorities for each channel.

The embodiments and examples set forth herein are presented to best explain the present invention and its practical application and to thereby enable those skilled in the art to make and utilize the invention. Those skilled in the art, however, should recognize that the foregoing description and examples have been presented for the purpose of illustration and example only. Other variations and modifications of the present invention will be apparent to those skilled in the art after reading the detailed description. Such variations and modifications are covered by the appended claims disclosed herein.

The description as set forth is not intended to be exhaustive or to limit the scope of the invention. Many modifications and variations are possible in light of the above teaching without departing from the spirit and scope of the following claims. It is contemplated that the use of the present invention can involve components having different characteristics. It is intended that the scope of the present invention be defined by the claims appended hereto, giving full cognizance to equivalents in all respects.

What is claimed is:

1. A method in a data-processing system for optimizing data mirroring operations, said method comprising the steps of:

selecting at least one data channel from among a plurality of data channels associated with said data-processing system, wherein said at least one data channel comprises a data channel that is a least occupied data channel among said plurality of data channels;

operating a plurality of data mirroring operations simultaneously on said at least one data channel, in response to selecting said at least one data channel from among said plurality of data channels; and prioritizing said plurality of data channels by dedicating at least one data channel among said plurality of data channels to data mirroring operations only and designating at least one other data channel from among said plurality of data channels to disk operations associated with said data-processing system, thereby optimizing and improving data mirroring operations associated with said data-processing system by queuing multiple data mirroring operations on every channel simultaneously, creating an ideal sized read or write operation so as to achieve full channel utilization, providing all data transfer information requirements at a same time a mirroring command is sent, ensuring that a least busy channel is always utilized when mirroring operations are being initiated, and designating priorities for each channel.

2. The method of claim 1 further comprising the steps of:

examining a controller associated with said at least one data channel utilizing a driver of said data-processing system;

transferring from said driver, data having only a maximum data length, wherein said maximum data length is determined by a maximum data size supported by said controller; and automatically dividing a request for a data mirroring operation associated with said transfer of said data from said driver into a plurality of maximum-sized data mirroring operations, if said data comprises a data length that exceeds said maximum data size supported by said controller.

3. The method of claim 1 further comprising the step of:

automatically compiling all data transfer information when a request for at least one mirroring operation is provided.

4. A method in a data-processing system for optimizing data mirroring operations, said method comprising the steps of:

selecting at least one data channel from among a plurality of data channels associated with said data-processing system;

operating a plurality of data mirroring operations simultaneously on said at least one data channel, in response to selecting said at least one data channel from among said plurality of data channels; and prioritizing said plurality of data channels by dedicating at least one data channel among said plurality of data channels to data mirroring operations only and designating at least one other data channel from among said plurality of data channels to disk operations associated with said data-processing system, thereby optimizing and improving data mirroring operations associated with said data-processing system by queuing multiple data mirroring operations on every channel simultaneously, creating an ideal sized read or write operation so as to achieve full channel utilization, providing all data transfer information requirements at a same time a mirroring command is sent, ensuring that a least busy channel is always utilized when mirroring operations are being initiated, and designating priorities for each channel.

5. The method of claim 4 wherein the step of selecting at least one data channel from among a plurality of data channels associated with said data-processing system, further comprises the step of:

selecting said at least one data channel from among said plurality of data channels, wherein said at least one data channel comprises a data channel that is a least occupied data channel among said plurality of data channels.

6. A method in a data-processing system for optimizing data mirroring operations, said method comprising the steps of:
selecting at least one data channel from among a plurality of data channels associated with said data-processing system, wherein said at least one data channel comprises a data channel that is a least occupied data channel among said plurality of data channels;
operating a plurality of data mirroring operations simultaneously on said at least one data channel, in response to selecting said at least one data channel from among said plurality of data channels;
examining a controller associated with said at least one data channel utilizing a driver of said data-processing system;
transferring from said driver, data having only a maximum data length, wherein said maximum data length is determined by a maximum data size supported by said controller; and
automatically dividing a request for a data mirroring operation associated with said transfer of said data from said driver into a plurality of maximum-sized data mirroring operations, if said data comprises a data length that exceeds said maximum data size supported by said controller, thereby optimizing and improving data mirroring operations associated with said data-processing system by queuing multiple data mirroring operations on every channel simultaneously, creating an ideal sized read or write operation so as to achieve full channel utilization, providing all data transfer information requirements at a same time a mirroring command is sent, ensuring that a least busy channel is always utilized when mirroring operations are being initiated, and designating priorities for each channel.

7. The method of claim 6 further comprising the step of:
prioritizing said plurality of data channels by dedicating at least one data channel among said plurality of data channels to data mirroring operations only and designating at least one other data channel from among said plurality of data channels to disk operations associated with said data-processing system.

8. A data-processing system for optimizing data mirroring operations, said system comprising:
at least one data channel selected from among a plurality of data channels associated with said data-processing system; and
a plurality of data mirroring operations, which are capable of operating simultaneously on said at least one data channel, in response to a selection of said at least one data channel from among said plurality of data channels, and wherein all data transfer information is automatically compiled when a request for at least one mirroring operation is provided, wherein said plurality of data channels is prioritized by dedicating at least one data channel among said plurality of data channels to data mirroring operations only and designating at least one other data channel from among said plurality of data channels to disk operations associated with said data-processing system, thereby optimizing and improving data mirroring operations associated with said data-processing system by queuing multiple data mirroring operations on every channel simultaneously, creating an ideal sized read or write operation so as to achieve full channel utilization, providing all data transfer information requirements at a same time a mirroring command is sent, ensuring that a least busy channel is always utilized when mirroring operations are being initiated, and designating priorities for each channel.

9. The system of claim 8 further comprising:
a controller associated with said at least one data channel;
a driver for examining said controller, such that said driver transfers data having only a maximum data length, wherein said maximum data length is determined by a maximum data size supported by said controller; and
wherein a request for a data mirroring operation associated with said transfer of said data from said driver is automatically divided into a plurality of maximum-sized data mirroring operations if said data comprises a data length that exceeds said maximum data size supported by said controller.

10. The system of claim 8 wherein said at least one data channel comprises a data channel that is a least occupied data channel among said plurality of data channels.

11. A data-processing system for optimizing data mirroring operations, said system comprising:
at least one data channel selected from among a plurality of data channels associated with said data-processing system;
a plurality of data mirroring operations, which are capable of operating simultaneously on said at least one data channel, in response to selecting said at least one data channel form among said plurality of data channels; and
wherein said plurality of data channels are prioritized by dedicating at least one data channel among said plurality of data channels to data mirroring operations only and designating at least one other data channel from among said plurality of data channels to disk operations associated with said data-processing system, thereby optimizing data mirroring operations associated with said data-processing system by queuing multiple data mirroring operations on every channel simultaneously, creating an ideal sized read or write operation so as to achieve full channel utilization, providing all data transfer information requirements at a same time a mirroring command is sent, ensuring that a least busy channel is always utilized when mirroring operations are being initiated, and designating priorities for each channel.

12. The system of claim 11 wherein said at least one data channel comprises a data channel that is a least occupied data channel among said plurality of data channels.

13. A data-processing system for optimizing data mirroring operations, said system comprising:
at least one data channel selected from among a plurality of data channels associated with said data-processing system, wherein said at least one data channel comprises a data channel that is a least occupied data channel among said plurality of data channels;
a plurality of data mirroring operations, which are capable of operating simultaneously on said at least one data channel, in response to selecting said at least one data channel from among said plurality of data channels;
a controller associated with said at least one data channel;
a driver for examining said controller, such that said driver is capable of transferring data having only a maximum data length, wherein said maximum data length is determined by a maximum data size supported by said controller, wherein said at least one data channel comprises a data channel that is a least occupied data channel among said plurality of data channels; and wherein a request for a data mirroring operation associated with said transfer of said data from said driver is capable of being automatically divided into a plurality of maximum-sized data mirroring operations, if said data comprises a data length that exceeds said maximum data size supported by said controller; and wherein said plurality of data channels are capable of being prioritized by dedicating at least one data channel among said plurality of data channels to data mirroring operations only and designating at least one other data channel from among said plurality of data channels to disk operations associated with said data-processing system thereby optimizing and improving data mirroring operations associated with said data-processing system by queuing multiple data mirroring operations on every channel simultaneously, creating an ideal sized read or write operation so as to achieve full channel utilization, providing all data transfer information requirements at a same time a mirroring command is sent, ensuring that a least busy channel is always utilized when mirroring operations are being initiated, and designating priorities for each channel.

* * * * *